US012809869B2

(12) United States Patent
Lee et al.

(10) Patent No.: US 12,809,869 B2
(45) Date of Patent: Nov. 24, 2026

(54) DYNAMIC QUERY DATA CACHING

(71) Applicant: T-Mobile USA, Inc., Bellevue, WA (US)

(72) Inventors: Farrah Young Lee, Bellevue, WA (US); James Byung Ha No, Covington, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 7 days.

(21) Appl. No.: 18/948,763

(22) Filed: Nov. 15, 2024

(65) Prior Publication Data

US 2026/0140951 A1 May 21, 2026

(51) Int. Cl.
*G06F 16/2455* (2019.01)
*G06F 16/248* (2019.01)

(52) U.S. Cl.
CPC ...... *G06F 16/24552* (2019.01); *G06F 16/248* (2019.01)

(58) Field of Classification Search
CPC ......................... G06F 16/24552; G06F 16/248
USPC .......................................................... 707/769
See application file for complete search history.

(56) References Cited

U.S. PATENT DOCUMENTS

| | | | | |
|---|---|---|---|---|
| 6,826,557 | B1 * | 11/2004 | Carter | G06F 16/24552 |
| 7,467,131 | B1 * | 12/2008 | Gharachorloo | G06F 16/9574 |
| 10,394,826 | B1 * | 8/2019 | Viswanathan | G06F 16/245 |
| 12,277,147 | B1 * | 4/2025 | No | G06F 16/248 |
| 2013/0054584 | A1 * | 2/2013 | Kalra | G06F 16/9537 707/E17.11 |
| 2014/0337338 | A1 * | 11/2014 | Shinn | G06F 16/9535 707/737 |
| 2015/0161204 | A1 * | 6/2015 | Kim | G06F 16/24522 707/771 |
| 2016/0284221 | A1 * | 9/2016 | Hinkle | G01C 21/20 |
| 2018/0276880 | A1 * | 9/2018 | VanderLugt | G06T 17/05 |
| 2021/0357441 | A1 * | 11/2021 | Zhuo | G06F 16/3322 |
| 2025/0371002 | A1 * | 12/2025 | Ramireddy | G06F 16/24539 |

* cited by examiner

*Primary Examiner* — Joshua Bullock
(74) *Attorney, Agent, or Firm* — Lee & Hayes, P.C.

(57) ABSTRACT

Systems and methods for caching queries and query results data to improve the efficiency of responding to query requests are described. A dynamic query data caching system may generate query data structures for newly received query requests, adding the generated query and a weight for individual queries to such query data structures. Query results data may be obtained and stored for use in responding to future query requests. Weight may be reduced over time and compared periodically to a threshold to determine if the query should be removed. If the query gets used before it expires, the weight may be reinitialized. Once a weight meets the threshold, the query and any associated results data may be deleted.

19 Claims, 8 Drawing Sheets

| | Query Data Table 700 | | | | |
|---|---|---|---|---|---|
| 701 | Query Identifier 710 | Query 712 | Results Location 714 | Query Weight 716 | Last use 718 |
| 702 | Query Identifier 720 | Query 722 | Results Location 724 | Query Weight 726 | Last use 728 |
| 703 | Query Identifier 730 | Query 732 | Results Location 734 | Query Weight 736 | Last use 738 |
| 704 | Query Identifier 740 | Query 742 | Results Location 744 | Query Weight 746 | Last use 748 |
| | ⋮ | | | | |
| 70X | Query Identifier 7X0 | Query 7X2 | Results Location 7X4 | Query Weight 7X6 | Last use 7X8 |

DYNAMIC QUERY DATA CACHING

BACKGROUND

With the advancement of computing technology and the proliferation of computing devices, there has been an exponential growth in the amount of data collected and stored by various computing systems. To determine useful information from such data for particular purposes, data sources are queried for specific subsets of stored data. Because the datasets being queried for specific subsets of data may be very large, it may be time-consuming to process such queries even with modern computing technology. This may make it challenging to provide query results to users in a timely manner.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
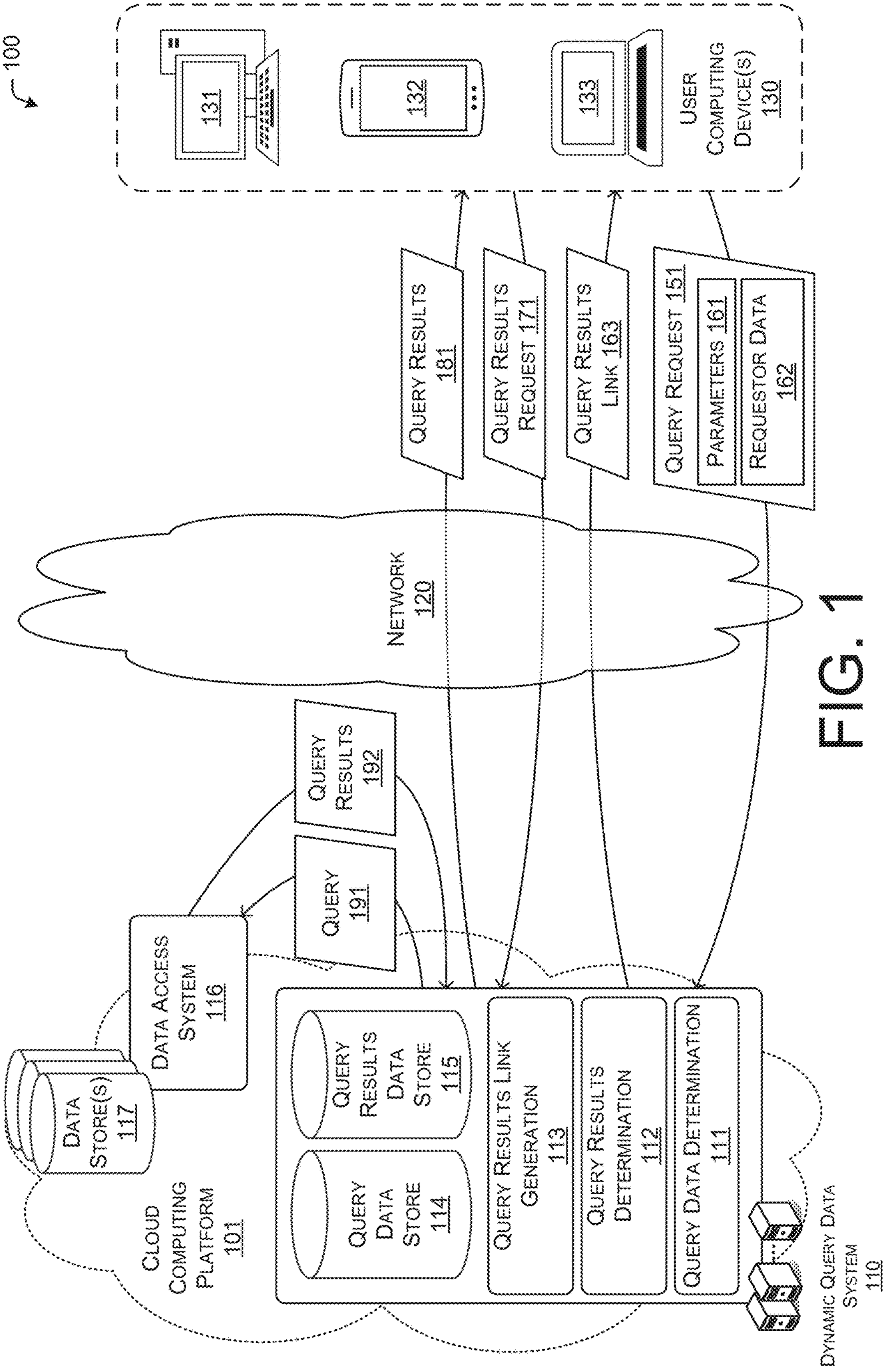
FIG. 1 is a schematic diagram of an illustrative computing environment in which systems and techniques for dynamic query data caching may be implemented, in accordance with examples of the disclosure.

This disclosure is directed in part to systems and techniques for improving the performance of query processing and query results processing in computing systems that may store and process large amounts of data. Such systems include a variety of computing devices and/or resources (e.g., compute resources in a cloud computing platform)

configured to communicate using any one or more networks that may facilitate wireless and/or wired communications services for one or more such devices and/or resources. Such networks include networks that support one or more 3GPP standards, including, but not limited to, Long Term Evolution (LTE) networks (e.g., 4G LTE networks), New Radio (NR) networks (e.g., 5G NR networks), and 6G networks. However, the disclosed systems and techniques may be applicable in any network and system in which a user computing device may request and receive access to stored data using any communications protocol or technology.

In examples, the disclosed systems and techniques may enhance the efficiency of executing queries and retrieving data based on queries in computing systems that store and/or process large amounts of data. In conventional systems, even those employing the latest processing and data retrieval technologies, processing a query on a vast dataset may be time-consuming. This may be especially true for geospatial queries on large datasets that may be geographically distributed. Such datasets may be distributed across multiple data stores and/or cloud data storage resources that may implemented on physical resources that may be widely distributed geographically. Moreover, the costs of accessing and retrieving data from such resources may increase as the volume of data to be processed increases. Large organizations may maintain datasets exceeding hundreds of terabytes and may add to such datasets on a daily basis. Modern computing devices and data processing technologies may take on the order of several minutes or more to retrieve data fully responsive to a query executed on such a dataset. This makes the use of such datasets unwieldy when real-time responsive information may be needed, such as in customer service and rapid response situations. Moreover, because such datasets are so large, more computing resources are required to process such queries, raising the cost of making use of these very large datasets.

The disclosed systems and techniques for dynamic query data caching address these deficiencies of conventional systems by providing an efficient means of providing query results from large datasets while maintaining up-to-date responsive data and automatically reducing resources dedicated to unused queries and query results. The dynamic query data system may receive and process a request for a query (e.g., a geospatial query) from a user computing device. This request may include one or more parameters that may be used to generate a query. For example, the parameters may include one or more geospatial attributes, such as location identifying data (e.g., address, ZIP code, coordinates, latitude and longitude, etc.) and/or shape or geometry data defining a geographical or geospatial location. The parameters may also, or instead, include any other query parameters, including one or more business attributes, data properties, etc. This request may further include user and/or computing device data that may be used by a dynamic query data system to authenticate the requesting user and/or device and/or to determine whether and how to respond to the request (e.g., an address or location to which to send query results).

The dynamic query data system may generate a query based on this request and the included parameters. Using the generated query, the dynamic query data system may determine whether this query is represented in current query data stored at a query data store. If not, the dynamic query data system may store the query in a query data store with related data. For example, the dynamic query data system may initialize a query data structure in the query data store and store, in the data structure, a query identifier, the query (and/or data representing the content of the query), and a query weight. The dynamic query data system may initialize the query weight to an initial query weight value.

The dynamic query data system may execute the query at one or more datasets configured in a computing environment. These datasets may be stored at various data stores managed by a data access system (e.g., a cloud data storage and access system). The dynamic query data system may transmit a request to execute the query to this data access system, which may execute the query on the various applicable datasets, collect the responsive data as query results, and transmit the query results to the dynamic query data system. The dynamic query data system may then store the query results at a query results data store and associated the results, in the query results data store, with the query and/or the associated query identifier. The dynamic query data system may further store an indication of the location of these results (e.g., a results identifier or other index, identifier, etc.) at the query data structure in the query data store.

The dynamic query data system may generate a link or other access means for the query results stored in the query results data store. In examples, the dynamic query data system may generate a temporary link to the results data. Because the results data may typically be secure data that is not generally accessible to all users, the system may be configured to only grant limited, temporary access to such data. In particular examples, this link may be a "presigned" uniform resource locator (URL) that provides, upon activation by a computing device, temporary access only to the resource indicated in the presigned URL (in this example, the query results data at the query results data store). By using such temporary links, the disclosed systems and techniques further ensure the security of the source datasets by preventing any direct access to these datasets when providing query results data. This temporary link may then be transmitted to the requesting user for activation to access the query results data.

Because this query and the associated query results have been stored at the dynamic query data system, the system may reuse this data for future queries without using the data access resources used to initially acquire the query results data. For example, another query request may be received at the dynamic query data system with the same parameters. The system may generate, based on these parameters, an associated query. The dynamic query data system may then determine that this query matches the earlier generated query by comparing this query to the query data structures stored in the query data store. Based on this, the system may determine the location of the associated query results data in the query results data store using the query data structure associated with the matching query. The system can retrieve these results from the query results data store without invoking the data access resources used to initially acquire this results data. The system may then generate a new temporary link directed at the query results data for the newly received request and transmit this link to the requesting device.

As will be appreciated, this system may save significant resources by reusing query results without further invoking data access resources. While this may be particularly useful for commonly requested queries, not all queries may be used regularly or very often. The popularity of certain queries may increase and decrease over time based on various factors (e.g., seasonal, product popularity, recurring vs. resolved issues, etc.). In order to further conserve resources and improve system efficiencies, the system may track the usage of queries and remove data associated with queries that are no longer used or less likely to be used. Because the query results data for some queries may be quite voluminous, this may help in conserving data storage resources at the dynamic query data system and the processing resources that may be used at the dynamic query data system to update query results (as described in more detail herein).

As noted above, when initializing a query data structure, the system may initialize a query weight. This may be (e.g., data representing) a numerical value. Periodically and/or in response to particular conditions, the dynamic query data system may reduce the value of this weight if it has not been used (e.g., for a period of time). In such examples, a non-linear decay function or a logarithmic decay function may be used to generate an updated query weight value. For example, at every time period t (e.g., every hour, every day, every week, etc.), the system may execute a query weight reduction operation that may generate an updated query weight value as a function of the current query weight and the time period. The system may then compare the updated query weight value to a query deletion threshold value. If the updated query weight value fails to meet or exceed the query deletion threshold value, the system may delete the query and the associated query results from the query data store and the query results data store, respectively. If not (e.g., the query weight value meets or exceeds the query deletion threshold value), the system may retain the query (with the updated query weight value) and its associated results for future use. Note that in other examples, including as described herein, updating and/or evaluation of the query weight value may be performed in response to conditions or other operations, such as the updating of query results data.

In examples, equation (1) below may be used to implement a logarithmic attention decay model that may be used to reduce a query weight over time.

$$E(t) = E_0 \cdot \log\left(\frac{1}{1 + k \cdot t}\right) \tag{1}$$

In equation (1), E(t) may represent a current weight, where $E_0$ may represent a number of matches, or "hits," for a particular query. k may be a decay constant and t may be time, in particular examples, in days. In such examples, when E(t) falls below the query deletion threshold value, the system may delete the query and the associated query results from the query data store and/or the query results data store, respectively.

In an illustrative, non-limiting example, if a particular query has had 12 matches ($E_0$=12) and the decay constant k=0.5, after four days (t=4) the query weight value for that query may be 0.75 (i.e., 12*log(1/1+0.5*4)=0.75). In this example, if the query deletion threshold value is one, this particular query and associated data would be removed (i.e., 0.75<1).

If the system receives a query request that matches a particular query represented in the query data store (e.g., query match and/or query identifier match), the system may, along with providing the results to the requesting computing device, update the associated query weight value to reflect the query's recent use. In examples, in response to receiving a request for a query currently represented in the query data store, the dynamic query data system may reinitialize that query's weight value to an initial value. This may provide a new "lifespan" to any query that is subject to repeated use. Alternatively, the dynamic query data system may increase the weight of a query by a particular amount or number (e.g., increment the query weight value) in response to receiving a request for that query. This may extend the lifespan of that query without entirely restoring its lifespan, which may slow, but not overly hinder, the removal of queries that are seldom used, even if they are used on occasion. This may also substantially increase the lifespan of queries that are heavily used, for example, where the system is configured to allow a query weight value to exceed an initial query weight value.

In examples, the dynamic query data system may be configured to update the query results associated with stored query data periodically and/or in response to various conditions. As will be appreciated, the data representing query results may change over time as data is added, removed, and modified in the various datasets from which such query results are determined. Therefore, the system may be configured to execute the queries stored in the query data store to update the associated results data in the query results data store at one or more configured time periods (e.g., every hour, day, week, etc.). In this way, recent data may be available for commonly used queries without involving data access resources more regularly. Moreover, such updates may be scheduled for times when resource costs are lower.

Alternatively or additionally, one or more conditions or events may trigger an updating of query results data. For example, where the system is configured to increment query weight values on each receipt of an associated query request, when a particular query weight exceeds an update threshold, the system may perform a query results update. This may ensure that more popular queries are updated more often.

Query results updating operations may also be triggering events that initiate query weight updates and evaluations. For example, if query results are updated daily, at each update, the system may first update the query weights and evaluate whether the associated queries should remain active and represented in the query data store. Those that have weights that do not satisfy retention criteria may be removed before the update operation is performed. In this way, the system may avoid updating query results data for queries that are expired.

By tracking queries and their associated results data, the systems and methods described herein can improve the performance and increase the efficiency of data access operations and computing resource utilization, especially for large datasets. The disclosed systems and methods also increase the efficiency of query data processing by tracking query usage through weights and removing queries and results data that are not commonly used. Examples of various systems and methods for accessing and collecting data that may enhanced by the disclosed dynamic query data caching systems and techniques can be found, for example, in U.S. Pat. No. 11,789,986, issued Oct. 17, 2023, and titled "Methods and Systems for Querying Data Within a Geographical Boundary Using a Query Tool," the contents of which are herein incorporated by reference in its entirety and for all purposes. The methods and systems described herein may be more efficient and/or more robust than conventional techniques, as they may increase the efficiency of data retrieval by reducing unnecessary data access resource utilization for common queries, and therefore also reduce network, memory, and computing resource utilization consumed by data access operations performed across a network and/or in a cloud computing environments. The user experience may also be greatly improved by having large dataset query results ready upon request rather than requiring a potentially time-consuming re-querying of such datasets upon each query request.

That is, the methods and systems described herein provide a technological improvement over existing systems and processes by facilitating an improved user experience and increasing device and network efficiency, reducing the use of computing resources to obtain results of common queries. In addition to improving the efficiency of network and device resource utilization, the systems and methods described herein can provide more robust systems by, for example, making more efficient use of network and computing devices and resources by reducing unnecessary and/or repetitive query processing operations and network interactions, thereby freeing network and computing resources for more productive operations.

Illustrative environments, processes, and techniques for implementing systems and methods for dynamic query data caching are described below. However, the described systems and techniques may be implemented in other environments.

Illustrative System Architecture

FIG. 1 is a schematic diagram of an illustrative computing environment 100 in which the disclosed systems and techniques may be implemented. The environment 100 may include a cloud computing platform 101 that may support various compute resources (e.g., data processing resources, data access resources, data storage resources, virtual machines, etc.). The cloud computing platform 101 may be any type and/or number of decentralized and/or remote data processing systems. The cloud computing platform 101, and/or any of the resources configured thereon, may communicate with systems, components, and functions in a network 120. The network 120 may be a wireless and/or wired communications network that may facilitate communication between computing devices, systems, and resources. The network 120 may be any type of communications network and may include any number and type of core and edge network components. Various connections between components and functions in the network 120 may be wired, wireless, or a combination thereof. Various connections between the network 120 and devices that communicate with the network 120 (e.g., via edge components such as base stations) may be wired, wireless, or a combination thereof. The cloud computing platform 101 and/or any of the resources configured thereon may communicate with various remote devices via the network 120. For example, the cloud computing platform 101 may exchange data and/or otherwise communicate with any one or more of the user computing device(s) 130. The user computing device(s) 130 may include any type of computing devices, mobile devices, server, or system (including one or more other cloud-based computing systems). Examples of the user computing device (s) 130 include computer 131, mobile device 132, and laptop computer 133. The systems, devices, components, and functions described herein may be implemented as physical devices, as software components and/or functions executing on one or more computing devices, and as any combination thereof.

In various embodiments, the network 120 may facilitate the establishment of communications sessions (e.g., packet-based communications sessions) between one or more of the user computing device(s) 130 and one or more systems configured at the cloud computing platform 101. In FIG. 1, connections between components may be logical and/or communications connections that may be facilitated by one or more wired and/or wireless connections and may include traversal of one or more devices, components, and/or functions that may or may not be shown in FIG. 1.

A dynamic query data system 110 may be configured at the cloud computing platform 101 (e.g., on resources provided or otherwise supported by the cloud computing platform 101). The dynamic query data system 110 may include a query data determination component 111 that may be configured to generate, based on a query request and query parameters, a query that may be used to access or otherwise request data from one or more datasets.

For example, one of the user computing device(s) 130, such as the computer 131, may transmit a query request 151 to the dynamic query data system 110 via the network 120. The query request 151 may include query parameters 161 that may be any one or more parameters that may be used by the dynamic query data system 110 to generate a query. The query parameters 161 may include one or more geospatial attributes, such as location identifying data (e.g., address, ZIP code, coordinates, latitude and longitude, etc.) and/or shape or geometry data defining a geographical or geospatial location. The parameters may also, or instead, include any other query parameters, including one or more business attributes, data properties, etc.

The query request 151 may further include requestor data 162 that may be any data associated with the requestor originating the query requested 151 (here, computer 131). In this example, this may be an IP address and/or other address of the computer 131, a username of a user of the computer 131, a user email address, a telephone number, an account number, and/or any other information that may be of use in determining and providing query results to the computer 131. Using the parameters 161, the query data determination component 111 may be configured to generate a query.

The dynamic query data system 110 (in examples, the query data determination component 111) may be further configured to determine whether a requested query is currently represented in a query data store 114. The query data store 114 may be configured to store query data (e.g., individual data structures) for individual queries, such as a query identifier, an associated query or data representative of the query, a location of query results, and/or a query weight.

If the dynamic query data system 110 and/or the query data determination component 111 determines that a requested query is not currently represented in a query data store 114, it may generate and initialize a query data structure in the query data store 114 and store the query in this data structure. The dynamic query data system 110 and/or the query data determination component 111 may further determine a query identifier for the query and an initial query weight and store this data in the query's data structure at the query data store 114. In examples, the query identifier may be generated based on the query parameters 161. For example, the query identifier may be generated based on a location and a geometric shape of a geographical or geospatial query area. For instance, a query identifier may represent or be based on a geospatial location and an associated shape or geometry (e.g., polygon, line geometry, etc.) determined based on the query parameters 161. This may facilitate rapid identification of queries for the same or a substantially similar geographical area.

For a query with no existing entry in the query data store 114, the query data determination component 111 may provide the query to a query results determination component 112, in examples, along with the associated query identifier and requestor information, such as (e.g., at least a subset of) the requestor data 162. The query results determination component 112 may transmit a query communication 191 (e.g., a geospatial query) containing the query to a data access system 116. The data access system 116 may be any one or more data access systems that may perform data access and/or retrieval operations on one or more datasets of any type. For example, the data access system 116 may access or otherwise interact with data store(s) 117 that may be any type of data store configured to store one or more datasets. The data store(s) 117 may be geographically distributed and may store data associated with particular geographical areas.

In response to the query communication 191, the data access system 116 may retrieve data from the data store(s) 117 based on the query represented in the communication 191. The data access system 116 may generate a query results communication 192 that may contain the retrieved data and transmit this communication 192 to the dynamic query data system 110, and, in examples, to the query results determination component 112).

The query results determination component 112 may store the retrieved data represented in the query results communication 192 at a query results data store 115. The query results data store 115 may be configured to store query results and associated data, such as a query identifier. The query results determination component 112 may also store an indication of the location at the query results data store 115 of the retrieved data represented in the query results communication 192 (e.g., in the associated query data structure in the query data store 114).

A query results link generation component 113 may be configured to use this location to generate a link (e.g., a secure link, a temporary link, a presigned URL, etc.). This link may include an indication of the location of storage of the query results associated with the query stored on the query results data store 115. In examples, the link may also, or instead, include an indication of the query identifier and/or any other data that may allow at least temporary access to the results associated with a particular query. The dynamic query data system 110 (in examples, the query results link generation component 113) may generate and transmit a query results link communication 161 to the computer 131. The query results link communication 163 may be generated using the requestor data 163, for example, to determine a network address associated with the computer 131.

A user may operate the computer 131 to activate the link included in the query results link communication 163. Alternatively or additionally, the computer 131 may be configured to automatically activate the link. Activation of this link may generate a query results communication 171 that may be transmitted to the dynamic query data system 110. The dynamic query data system 110 (in examples, the query data determination component 111) may determine, from the query results request communication 171, a query results location and/or a query identifier. The dynamic query data system 110 (in examples, the query results determination component 112, in response to receiving this data from the query data determination component 111) may use the query results location and/or a query identifier to retrieve the stored query results from the query results data store 115. The dynamic query data system 110 (in examples, query results determination component 112) may transmit query results communication 181, including such results and/or data representative thereof, to the computer 131 via the network 120. The computer 131 may then present the results to a user (e.g., on a user interface, in a communication, etc.) and/or otherwise perform further data processing based on the results.

The results of queries stored in the query results data store 115 may be updated periodically and/or in response to one or more events, conditions, triggers, etc. For example, the dynamic query data system 110 and/or any component configured therein may determine, from the query data store 114, queries associated with query results data stored at the query results data store 115. The dynamic query data system 110 may then transmit a request for query results to the data access system 116 and receive responsive query results data. The dynamic query data system 110 may then update the query data stored at the query results data store 115 with this updated query results data.

The dynamic query data system 110 may also, or instead, periodically and/or in response to one or more events, conditions, triggers, etc., evaluate the query weights associated with queries stored at the query data store, as described herein. Such an event may be the updating of stored query results data. If the dynamic query data system 110 determines, based on a comparison of a query weight to query weight threshold value, that the query has expired, the dynamic query data system 110 may remove that query from the query data store 114 and may remove the associated query results data from the query results data store 115. If the dynamic query data system 110 determines, based on a comparison of a query weight to the query weight threshold value, that the query has not expired, the dynamic query data system 110 may retain the query data and the query results data. Other thresholds and retention criteria may be used and are contemplated within the scope of the instant disclosure.

By maintaining query results data at the query results data store 115 and ensuring that commonly used queries are tracked and pared when not in use, the dynamic query data system 110 may make more efficient use of resources generally, and in particular compute resources of the cloud computing platform 101. The dynamic query data system 110 may further ensure responsive and timely data response for queries to large datasets for requesting users and/or devices, such as user computing device(s) 130.

Illustrative Operations

Figure 2:
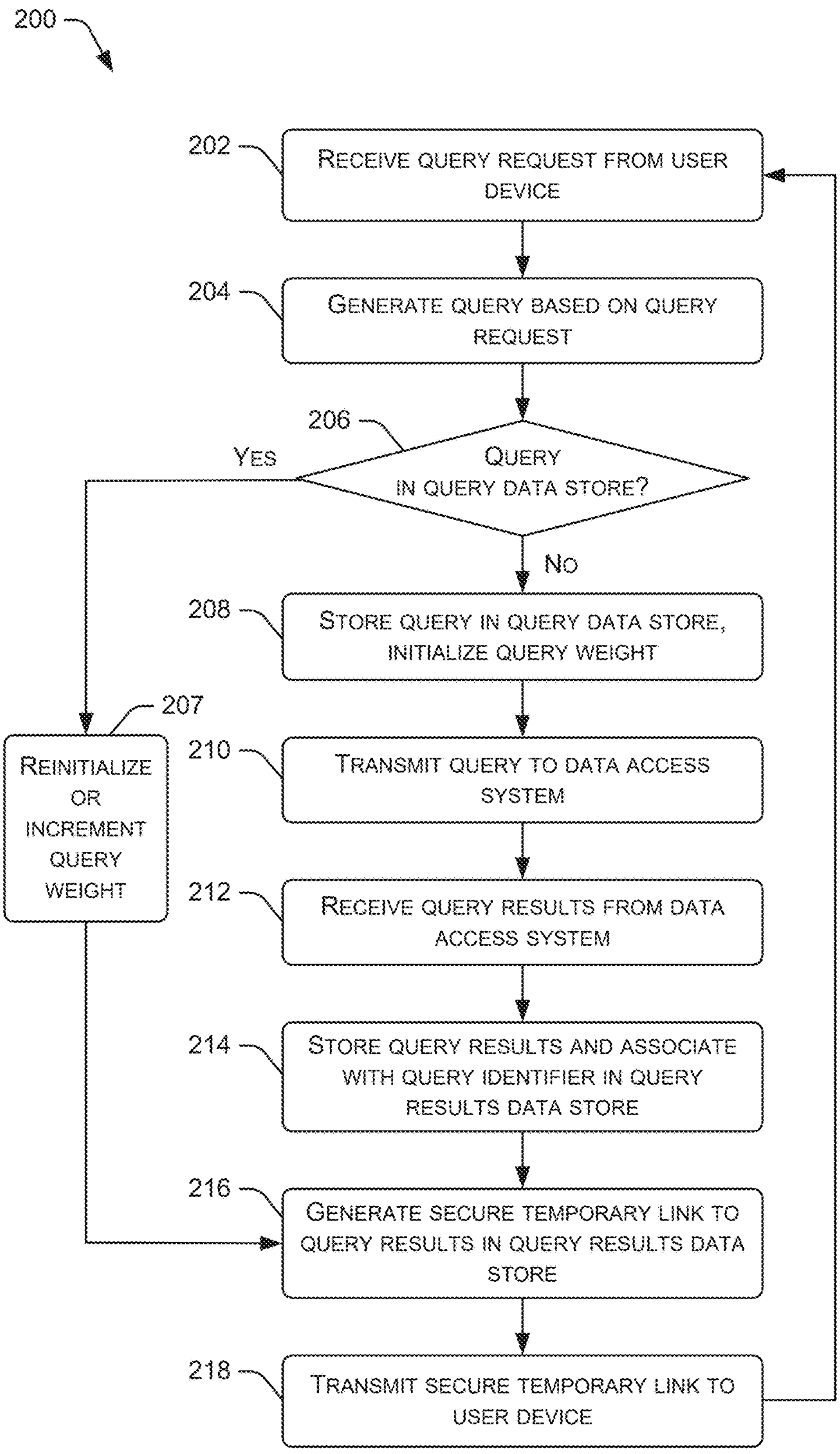
FIG. 2 is a flow diagram of an illustrative process for implementing dynamic query data caching, in accordance with examples of the disclosure.

FIG. 2 shows a flow diagram of an illustrative process 200 for processing a query request at a dynamic query data caching system according to the disclosed embodiments. The process 200 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 200 may be described with reference to the environment 100 of FIG. 1, however other environments may also be used. For example, any one or more operations described in regard to the process 200 may be performed by any one or more of the components and/or functions of the dynamic query data caching system 110.

At 202, a query request may be received at a dynamic query data caching system. In examples, this query request may include one or more query parameters that may be used to generate a query, as well as requestor information. As noted, this requestor information may include any information that may be used to return query results to a requestor (e.g., a user or user computing device). Such requestor information may include, but is not limited to, an IP address, any other type of device address, a username, a user email address, a telephone number, an account number, and/or any other information that may be of use in determining and providing query results to a requestor.

At 204, the system may generate a query (e.g., a geospatial query) using the query parameters included in the request received at 202. This may be any type of query in any format that the system determines is compatible with the dataset from which data is to be requested using the query. In many examples, the dynamic query data caching system may be configured to primarily generate "read" queries that only obtain data for a dataset and return such data to a requestor, but do not allow a requestor to make changes to a dataset. However, the disclosed systems and techniques may also be used to "create," "delete," "update," and other types of queries that may change the content of a dataset in some way.

At 206, the dynamic query data caching system may determine if the generated query is represented in a query data store. The dynamic query data caching system may compare the query to those stored in the query data store for a match or substantial similarity. Alternatively or additionally, the dynamic query data caching system may generate and use data representing query content, for example, to expedite comparisons of queries. In examples, the dynamic query data caching system may determine whether query identifiers match. For example, the system may generate a query identifier based on query parameters (e.g., received at 202), such as a location and a geometric shape of a geographical or geospatial query area. The system may then determine if this identifier matches a stored query identifier based on a geospatial location and an associated shape or geometry. This may facilitate rapid identification of queries for the same or a substantially similar geographical area. In other examples, the dynamic query data caching system may generate hashes for queries and use those as query identifiers. When query request is received, the system may generate a hash based on the query generated using the parameters included in the request. If this hash matches another query identifier hash, the system may determine that the queries match.

If the query generated based on the newly received query request matches a query in the query data store, at 207, the system may reinitialize, increment, or otherwise adjust the query weight to reflect the use of the associated query. The system may further store a time and/or date of the recent query access that may be used as described herein to determine when and/or if to decrease or otherwise reduce the query weight. The process may move to operation 216 for the generation and transmission of a link for the requestor, as described below.

If the query generated based on the newly received query request does not match or otherwise correspond to a query in the query data store, at 208, the system may generate a query data structure for the query and store the query data structure in a query data store. In examples, the system may store other data in such a data structure, such as a requestor data and a query identifier (e.g., an index or a hash value). Further at 208, the system may initialize a query weight value and store that value in the query data structure. The initial query weight value may be any suitable value, such as an integer value (e.g., 10, 20, 100, 1000, etc.) or any other value.

At 210, the dynamic query data caching system may transmit the generated query to a data access system to retrieve the results of the query. For example, the system may transmit a request to execute the query to one or more database management components or functions, or any other system or component configured to retrieve data from a dataset based on a query. At 212, the dynamic query data caching system may receive the results of the query from the data access system.

At 214, the dynamic query data caching system may store the received results data at a query results data store. The system may associate, in the query results data store, the received results data with a query identifier determined at one or more earlier operations. The system may also store a location of the results data at the query data store; however, in other examples, the system may use the query identifier to location the query results data in the query results data store.

At 216, whether the query was extant at the query data store or not, the dynamic query data caching system may generate a link to the query results data stored at the query results data store and associated with the query generated based on the query requestion received at 202. In examples, this may be a temporary link, such as a presigned URL. The link may be generated using the permissions associated with the dynamic query data caching system, as opposed to the requestor, as the access to the query results data store may be typically restricted to the dynamic query data caching system. At 218, the system may transmit the link to the requestor.

Figure 3:
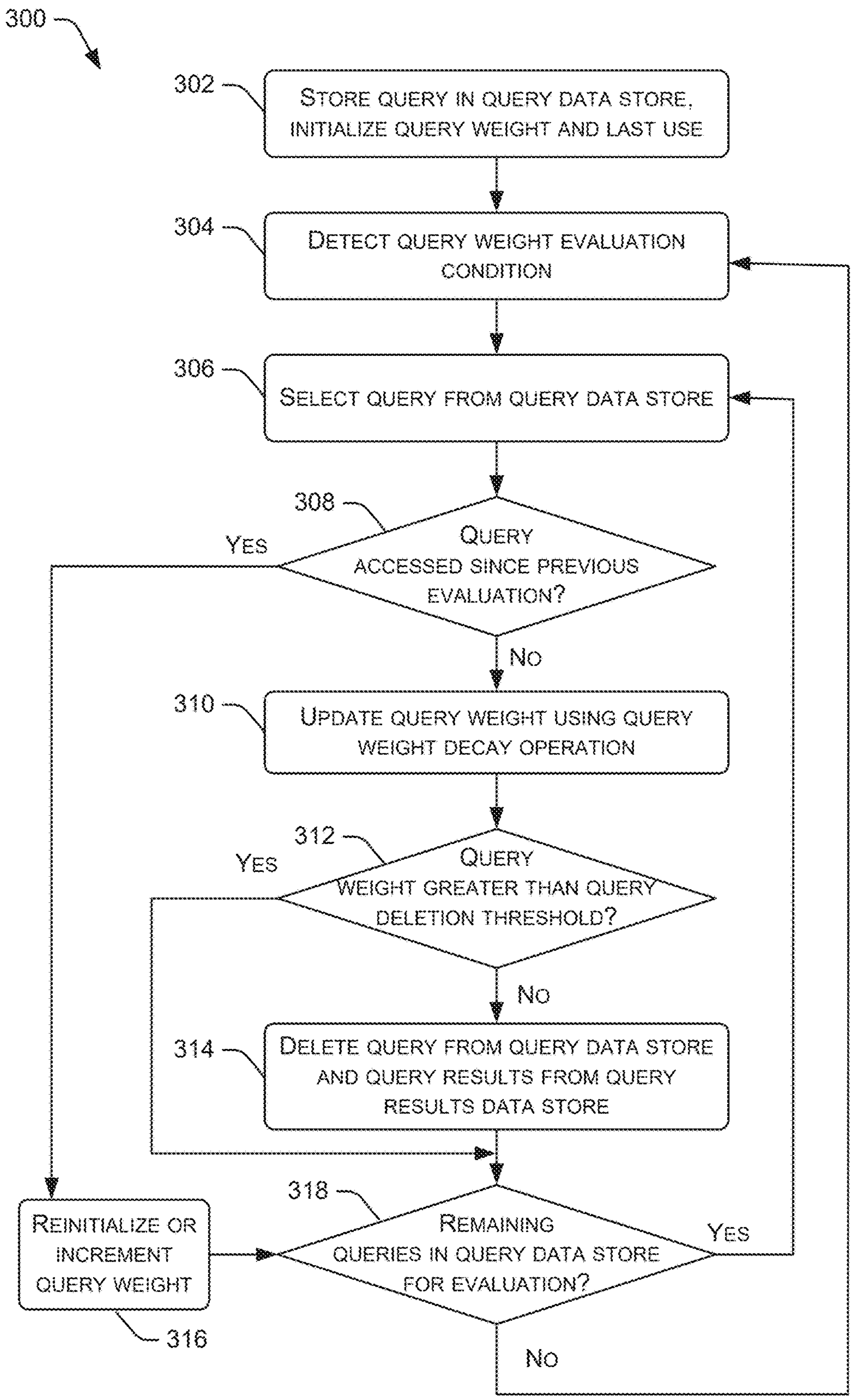
FIG. 3 is another flow diagram of an illustrative process for implementing dynamic query data caching, in accordance with examples of the disclosure.

FIG. 3 shows a flow diagram of an illustrative process 300 for evaluating query weights according to the disclosed embodiments. The process 300 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 may be described with reference to the environment 100 of FIG. 1, however other environments may also be used. For example, any one or more operations described in regard to the process 300 may be performed by any one or more of the components and/or functions of the dynamic query data caching system 110.

At 302, a query may be generated (e.g., in response to a query request) and stored in a query data store. For example, the dynamic query data caching system may have determined that the query does not already exist in the query data store and may, in response, generate a query data structure for the query. The system may store the query in this data structure along with other related information, such as requestor data and a query identifier. The system may further initialize a query weight at 302 and store the initial query weight in the query data structure. The system may also store in the data structure a "last use" value or some other indicator of the date and time of creation of the query data structure.

At 304, the system may detect a query weight evaluation condition. For example, the dynamic query data caching system may be configured to periodically evaluate query weights, and therefore, at 304, the system may determine that a timer has expired or a query weight evaluation time and date has been met. In other examples, the dynamic query data caching system may be configured to evaluate query weights in response to other detected conditions, such as updates to related datasets, administrator instructions, detection of heavy user traffic, high volumes of query requests, dataset updates, etc.

At 306, in response to the condition detected at 304, the system may select a query from the query data store for evaluation.

At 308, the dynamic query data caching system may evaluate the selected query. For example, at 308, the system may determine whether an individual query has been accessed or otherwise used for retrieving query data results since the last query weight evaluation process execution. For example, the system may determine if a "last used" date associated with the query extends beyond a query weight evaluation period. For instance, if query weights are evaluated daily, the system may determine whether the last used date and time is greater than 24 hours. Similarly, if the query weight evaluation period is one week, the system may determine whether the last used date and time is greater than seven days.

If, at 308, the system determines that the particular query under evaluation has been accessed since the previous query weight evaluation, the process may move to 316, where the system may reinitialize or increment the query weight. This may provide a new "lifespan" to this query that is apparently subject to relatively frequent use or otherwise extend this query's lifespan. The process may move to 318 to determine if there are remaining queries to evaluate in the query data store.

If, at 308, the system determines that the particular query under evaluation has not been accessed since the previous query weight evaluation, at 310, the system may update the associated query weight using a query decay operation. In examples, the system may use a non-linear decay function or a logarithmic decay function to generate an updated query weight value. This may allow the query's weight to decrease at a faster rate as the amount of time of disuse of the query extends. Other functions and/or operations may also, or instead, be used to determine an updated query weight for a particular query.

At 312, the system may determine if the (newly updated) query weight meets or exceeds a query deletion threshold (or, alternatively, fails to meet a query retention threshold value or otherwise qualifies for one of query retention or query deletion). If the updated query weight does not meet a threshold for deletion (or meets or exceeds a threshold for retention), the process 300 may move to 318 to determine if there are remaining queries to evaluate in the query data store. If the updated query weight does meet a threshold for deletion (or does not meet a threshold for retention), at 314, the system may remove the query from the query data store and may also remove any query results data associated with the query from the query results datastore. The process 300 may then move to 318 to determine if there are remaining queries to evaluate in the query data store.

At 318, after evaluating a particular query and its associated weight and taking responsive actions, if needed, the system may determine whether there are remaining queries to be evaluated in the query data store for this evaluation operation. If so, the process 300 may move to 306 where a subsequent query may be selected from the query data store for evaluation. If there are no further queries remaining to be evaluated, the process 300 may move to 304 to perform the evaluation operations in response to a subsequently detected query weight evaluation condition.

Figure 4:
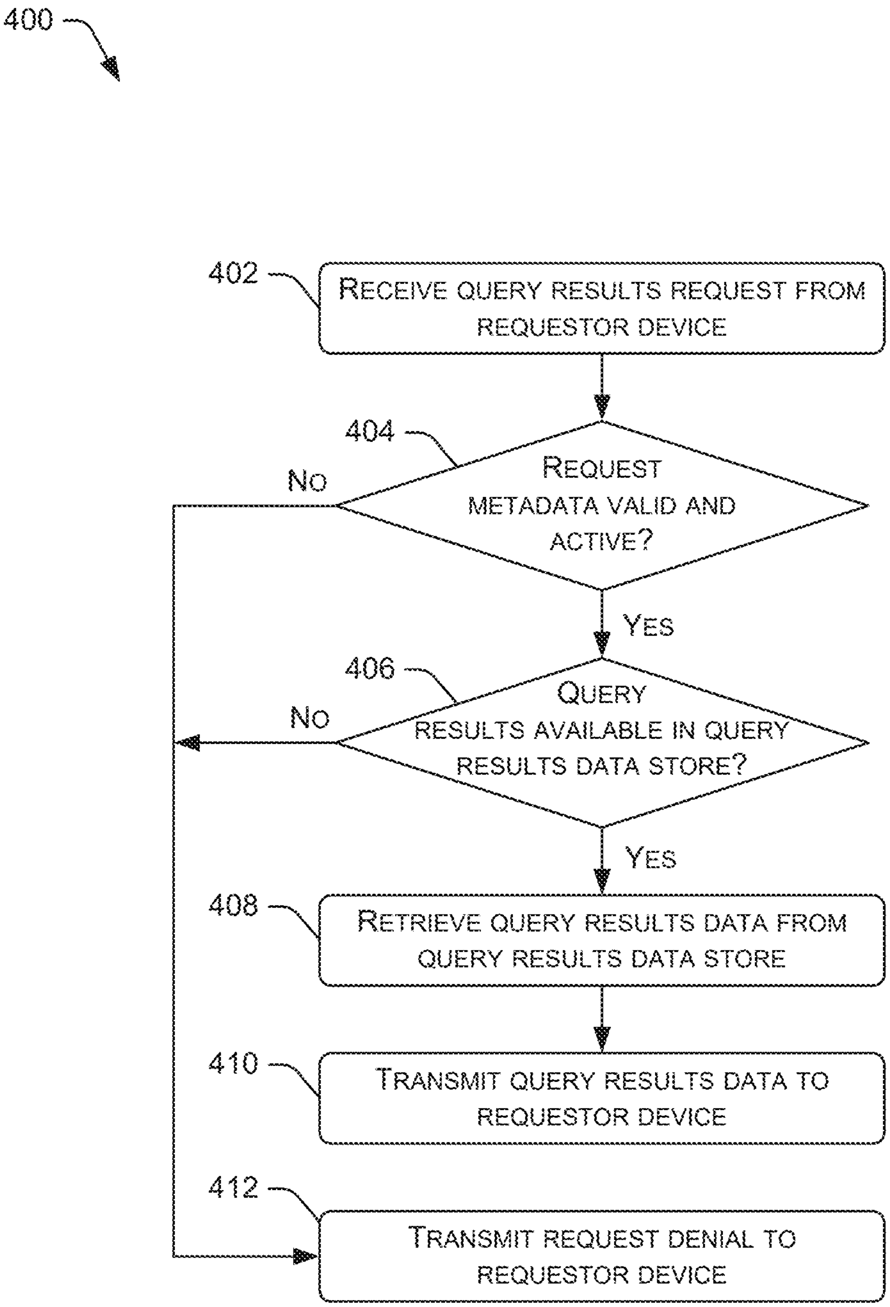
FIG. 4 is another flow diagram of an illustrative process for implementing dynamic query data caching, in accordance with examples of the disclosure.

FIG. 4 shows a flow diagram of an illustrative process 400 for processing a query results request according to the disclosed embodiments. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 may be described with reference to the environment 100 of FIG. 1, however other environments may also be used. For example, any one or more operations described in regard to the process 400 may be performed by any one or more of the components and/or functions of the dynamic query data caching system 110.

At 402, a query results request may be received by a dynamic query data caching system from a requestor computing device, for example, in response to a user activating a temporary link sent generated by a dynamic query data caching system in response to a query request from that device. The query results request may include an identifier of the query and/or an indication of the location of the query results data, either of which may be used to access the query results data in a query results data store according to examples.

At 404, the system may ensure that the request is valid (e.g., based on metadata) and active. For example, because the links used herein to provide access to query results data may be temporary, the system may determine, based on the request received at 402, whether the link generating the request has expired. The system may perform other validation operations, such as ensuring that device and/or user data in this request matches that of the original requestor.

If the request is no longer active or is otherwise not valid, the process 400 may move to operation 412 where a denial may be transmitted to the requestor. Alternatively, no actions may be taken at 412.

If, at 404, the system determines that the request is active and valid, at 406, the system may determine if the query results are available in the query data store. For example, the query data store may have been purged of data associated with expired queries since the link to the results was provided to the requestor. Alternatively, there may be an error or corruption of the request received at 402 that rendered information within the request If the data is available, at 408, the system may retrieve the requested data from the query results data store. For example, the system may use a query identifier indicated in the query results request to retrieve the query results data from the query results data store. Alternatively or additionally, the system may use a storage location data included with the query results request to retrieve the query results data from the query results data store. Other means of identifying the appropriate data to retrieve and provide to a requestor may also, or instead, be used. At 410, the system may transmit the query results data to the requestor device.

If the system determines, at 406, that the requested query results are not available in the query data store, the process may move to 412, where a denial may be transmitted to the requestor. Alternatively, no actions may be taken at 412.

Figure 5:
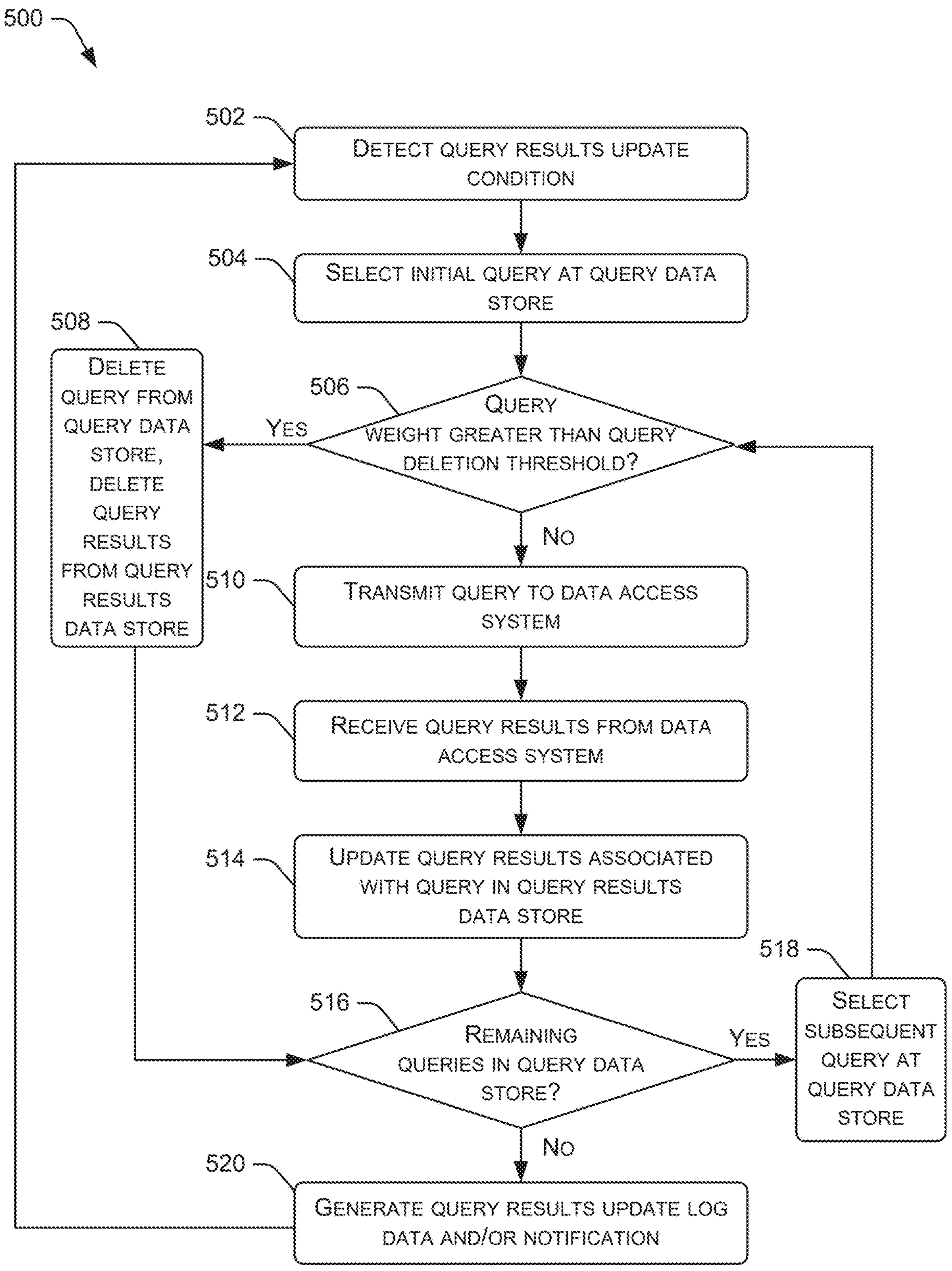
FIG. 5 is another flow diagram of an illustrative process for implementing dynamic query data caching, in accordance with examples of the disclosure.

FIG. 5 shows a flow diagram of an illustrative process 500 for updating query results data according to the disclosed embodiments. The process 500 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 500 may be described with reference to the environment 100 of FIG. 1, however other environments may also be used. For example, any one or more operations described in regard to the process 500 may be performed by any one or more of the components and/or functions of the dynamic query data caching system 110.

At 502, a dynamic query data caching system may detect a query results update condition. For example, the dynamic query data caching system may be configured to periodically update query results, and therefore, at 502, the system may determine that a timer has expired or that a query results update time and date have been met. In other examples, the dynamic query data caching system may be configured to update query results in response to other detected conditions, such as updates to related datasets, administrator instructions, detection of heavy user traffic, etc.

At 504, the system may access an initial query and/or data associated therewith at a query data store. For example, the system may access a query data structure to retrieve data related to the query, such as query weight, last used data, results location data, etc.

At 506, the system may determine if the query weight associated with the accessed initial query meets or exceeds a query deletion threshold (or, alternatively, fails to meet a query retention threshold value, or otherwise qualifies for one of query retention or query deletion).

If the query weight does not meet a threshold for deletion (or meets or exceeds a threshold for retention) or otherwise indicates that the query is active, at 510, the dynamic query data caching system may transmit the query to a data access system to request updated query data results from that system. These results may be received at 512.

At 514, the system may update the results data associated with the selected query in the query results data store using the updated query results data received at 512.

At 516, the system may determine if there are remaining queries in the query data for which updated query results data should be obtained. If so, at 518, a subsequent query may be selected for query results update processing, and the process 500 may return to 506.

If there are no further queries in the query data for which updated query results data should be obtained, at 520, the system may generate results data, such as query results update log data and/or notifications to a user or another system. The process 500 may return to 502 to perform query results update operations in response to a subsequently detected query weight evaluation condition.

If, at 506, the system determines that the query weight meets or exceeds a threshold for deletion (or does not meet a threshold for retention), or otherwise indicates that the query is no longer active, at 508, the dynamic query data caching system may delete the query from the query data store. Further at 508, the system may delete the query results data associated with the expired query from the query results data store. The process 500 may proceed to 516, where the system may determine if there are remaining queries in the query data for which updated query results data should be obtained, and proceed accordingly.

In summary, by maintaining readily accessible query results data for queries that are in regular use, while paring such data for queries that are no longer commonly received, the disclosed systems and techniques may be able to increase the efficiency of usage of cloud computing resources and other types of resources, while also improving the user experience and performance of associated systems and networks.

Illustrative Interfaces and Data Structures

Figures 6, 7:
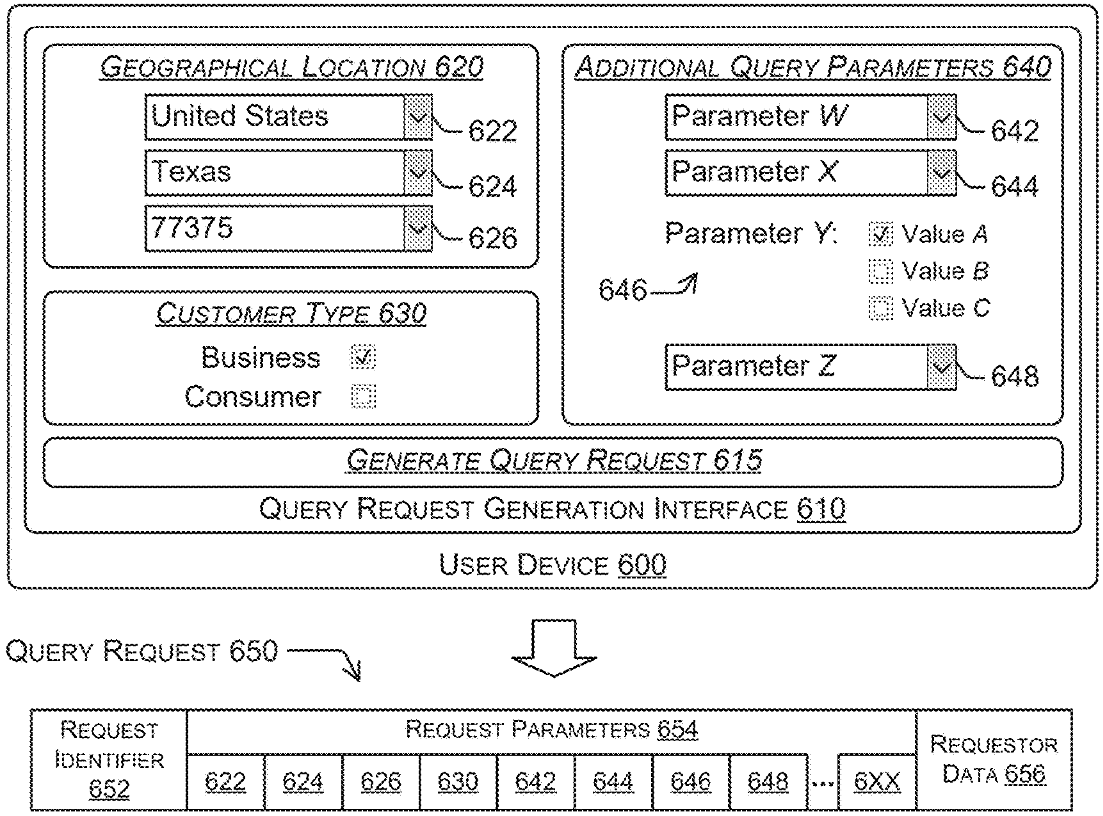
FIG. 6 is a diagram representing an illustrative interface and data structure that may be implemented and used in dynamic query data caching systems and techniques, in accordance with examples of the disclosure.
FIG. 7 is a diagram representing illustrative data structures that may be implemented and used in dynamic query data caching systems and techniques, in accordance with examples of the disclosure.

FIG. 6 shows a block diagram representing an illustrative interface and data structure. A user device 600 may generate and present a query request generation interface 610. The interface 610 may provide a variety of user-activatable controls that may be used to select, from predefined options, parameters that may be included in a query request. For example, the interface 610 may include a geographical location section 620 that may allow a user to select a particular country at control 622, a particular state at control 624, and a particular ZIP code at control 626. The interface 610 may also include a customer type section 630 that may allow a user to select a type of customer from predefined types (e.g., business or consumer, as shown here). Other parameters may be selectable in this interface 610, such as those shown in additional query parameters section 640, where a selectable control 642 may allow a user to select a value for a parameter W, a selectable control 644 may allow a user to select a value for a parameter X, a selectable control 646 may allow a user to select a value for a parameter Y, and a selectable control 648 may allow a user to select a value for a parameter Z.

The interface 310 may further include a control 615 that, when activated, generates a query request, such as query request 650, that may be transmitted to a dynamic query data caching system to initiate the dynamic query data caching operations described herein.

For example, the query request 650 may include data representing a request identifier 652 that may be used to identify the request. This information may be used by the dynamic query data caching system to track and respond to query requests. The query request 650 may also, or instead, include data representing request parameters 654, which may include the parameters indicated in the interface 610 as well as any other parameters. The query request 650 may also, or instead, include requestor data 656 that may include data such as an address, numbers, identifiers, etc. that may be associated with the requesting device and/or user.

By using predefined fields with limited potential parameter data in a query request generation interface, the number of possible queries may be reduced compared to the potential number of queries that may be available by using text boxes and other unbounded parameter selection and entry options. This may assist with maintaining limited query data structures and associated results data, which may improve the efficiency of operation of a dynamic query data caching system. On the other hand, the disclosed system and methods for dynamic query data caching may be implemented with open-ended query parameter inputs while retaining many of the benefits provided by the system and methods.

FIG. 7 shows a block diagram representing an illustrative data structure 700. The data structure 700 may represent a table that may be stored on a query data store described herein. Each row of this structure 700 may represent a query data structure. As shown here, the query data structure 701 may have a query identifier 710, a query 712 (e.g., generated using query request parameters, such as those in FIG. 6), a results location 714 that may indicate a location at a query results data store at which query results data associated with the query 712 may be located, a query weight 716 that may be used to as described herein to expire the query 701, and a last use 718 that may indicate the last use of this query based on a request received from a requestor. Each of the remaining queries data structures in this table 710 may have similar data.

In examples, the query identifiers 710 . . . 7X0 may be based on geospatial query parameters, such as a location and a geometric shape of a geographical or geospatial query area (e.g. a center point and an associated area about that center point). For instance, the query identifiers 710 . . . 7X0 may represent or be based on a geospatial location and an associated shape or geometry (e.g., polygon, line geometry, etc.) determined based on the query parameters.

Example User Equipment

Figure 8:
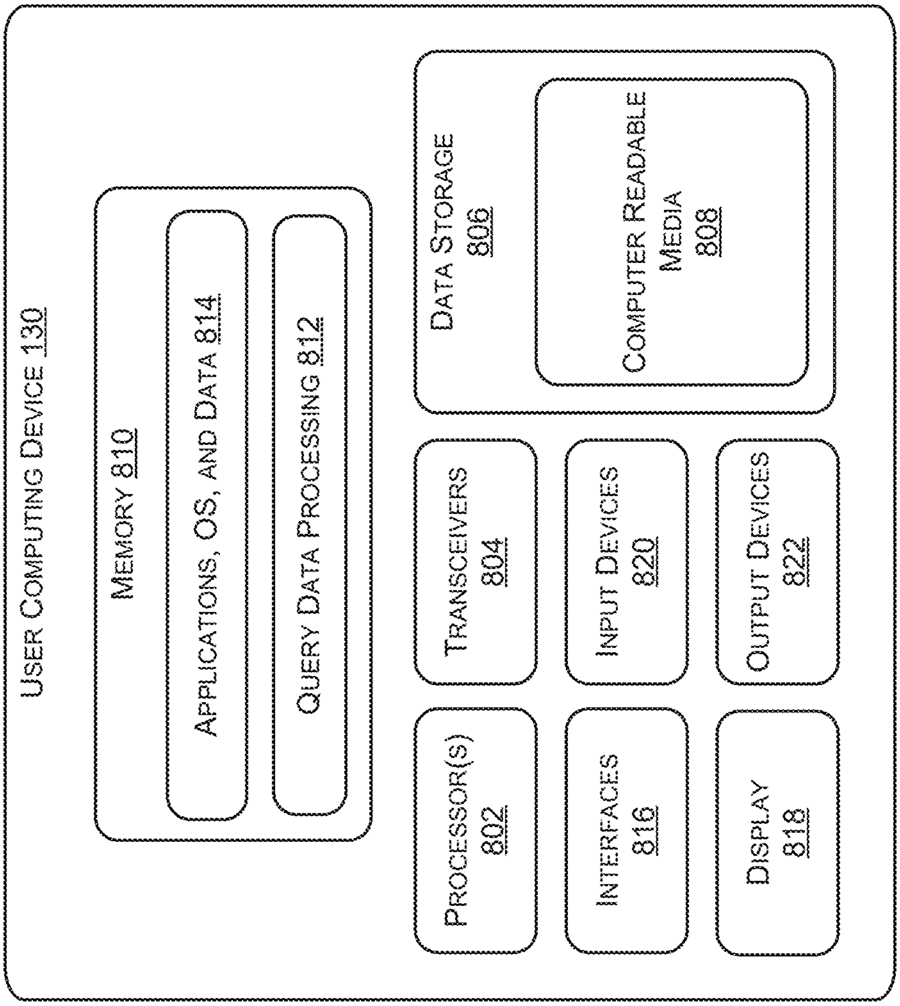
FIG. 8 is a schematic diagram of illustrative components in an example user computing device that is configured for use in and/or interaction with dynamic query data caching systems and techniques, in accordance with examples of the disclosure.

FIG. 8 is an example of a user computing device, such as any one of the user computing devices 130, for use with the systems and methods disclosed herein, in accordance with some examples of the present disclosure. The user computing device(s) 130 may include one or more processors 802, one or more transmit/receive antennas (e.g., transceivers or transceiver antennas) 804, and a data storage 806. The data storage 806 may include a computer-readable media 808 in the form of memory and/or cache. This computer-readable media may include a non-transitory computer-readable media. The processor(s) 802 may be configured to execute instructions, which can be stored in the computer-readable media 808 and/or in other computer-readable media accessible to the processor(s) 802. In some configurations, the processor(s) 802 is a Central Processing Unit (CPU), a Graphics Processing Unit (GPU), or both CPU and GPU, or any other sort of processing unit. The transceiver antenna(s) 804 can exchange signals with a network and/or other device, such as a base station configured at the network 120.

The user computing device(s) 130 may be configured with a memory 810. The memory 810 may be implemented within, or separate from, the data storage 806 and/or the computer-readable media 808. The memory 810 may include any available physical media accessible by a computing device to implement the instructions stored thereon. For example, the memory 810 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the user computing device(s) 130.

The memory 810 can store several modules, such as instructions, data stores, and so forth that are configured to execute on the processor(s) 802. In configurations, the memory 810 may also store one or more applications 814 configured to receive and/or provide voice, data, and messages (e.g., SMS messages, Multi-Media Message Service (MMS) messages, Instant Messaging (IM) messages, Enhanced Message Service (EMS) messages, one or more dialers and related components, etc.) to and/or from another device or component (e.g., the dynamic query data system 110). The applications 814 may also include one or more operating systems and/or one or more third-party applications that provide additional functionality to the user computing device(s) 130. The applications 814 may also include query processing-related components, such as the query data processing component 812 that may be configured to perform any of the antenna-related operations described herein. The memory may also, or instead, store bandwidth information, such as UE-supported bands, bandwidth(s), and bandwidth parts, one or more IP addresses, indications of sets of IP addresses, as well as communications session information such as UE-specific carrier bandwidth(s). The memory may also, or instead, antenna configuration information, session management component information, user plane component information, policy component information, etc.

Although not all illustrated in FIG. 8, the user computing device(s) 130 may also comprise various other components, e.g., a battery, a charging unit, one or more network interfaces 816, an audio interface, a display 818, a keypad or keyboard, and one or more input devices 820, and one or more output devices 822.

Example Computing Device

Figure 9:
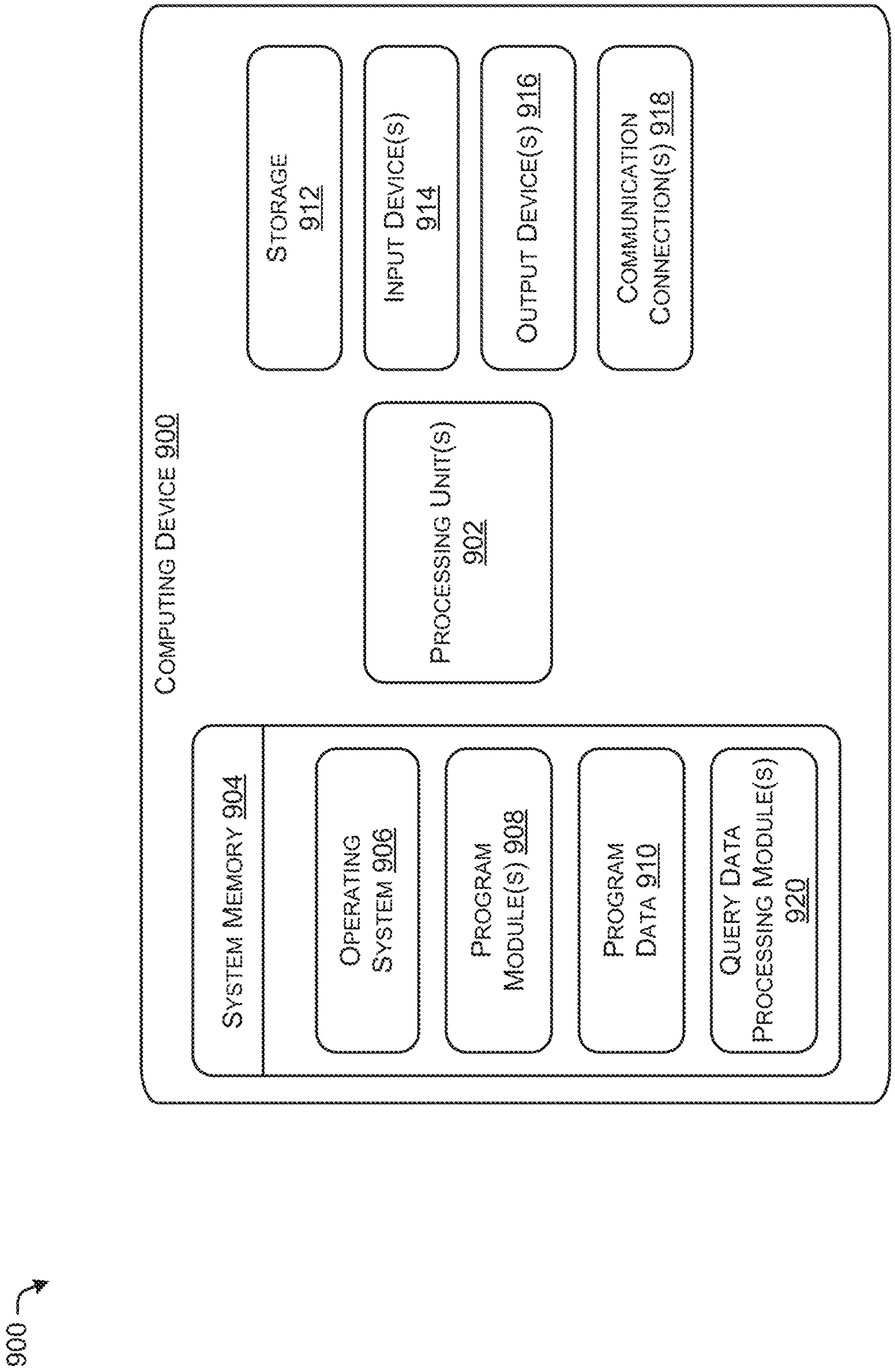
FIG. 9 is a schematic diagram of illustrative components in an example computing device that is configured for performing one or more aspects of dynamic query data caching, in accordance with examples of the disclosure.

FIG. 9 is an example of a computing device 900 for use with the systems and methods disclosed herein, in accordance with some examples of the present disclosure. The computing device 900 can be used to implement various components of a core network, a base station (e.g., at the network 120), and/or any servers, routers, gateways, gateway elements, administrative components, network components, etc. that can be used by a communication provider.

In various embodiments, the computing device 900 can include one or more processing units 902 and system memory 904. Depending on the exact configuration and type of computing device, the system memory 904 can be volatile (such as RAM), nonvolatile (such as ROM, flash memory, etc.) or some combination of the two. The system memory 904 can include an operating system 906, one or more program modules 908 (e.g., channel quality determination component(s) and/or module(s), UE configuration component(s) and/or module(s), base station configuration component(s) and/or module(s)), program data 910, and query data processing module(s) 920. The system memory 904 may be secure storage or at least a portion of the system memory 904 can include secure storage. The secure storage can prevent unauthorized access to data stored in the secure storage. For example, data stored in the secure storage can be encrypted or accessed via a security key and/or password.

The computing device 900 can also include additional data storage devices (removable and/or non-removable) such as, for example, magnetic disks, optical disks, or tape. Such additional storage is illustrated in FIG. 9 by storage 912.

The computing device 900 may store, in either or both of the system memory 904 and the storage 912, antenna information, antenna configuration information, UE information, location information, IP addresses, IP address data, timer information and/or timestamps, message transfer data, session management data, etc.

Non-transitory computer storage media of the computing device 900 can include volatile and nonvolatile, removable and non-removable media implemented in any method or technology for storage of information, such as computer-readable instructions, data structures, program modules, or other data. The system memory 904 and storage 912 are examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer-readable storage media can be part of the computing device 900.

In various embodiments, any or all of the system memory 904 and storage 912 can store programming instructions which, when executed, implement some or all of the functionality described above as being implemented by one or more systems configured in the environment 100 and/or components of the dynamic query data system 110.

The computing device 900 can also have one or more input devices 914 such as a keyboard, a mouse, a touch-sensitive display, voice input device, etc. The computing device 900 can also have one or more output devices 916 such as a display, speakers, a printer, etc. can also be included. The computing device 900 can also contain one or more communication connections 918 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: A method comprising receiving, at a dynamic query data caching system from a computing device, a query request comprising one or more query parameters, generating, at the dynamic query data caching system, a query data structure comprising a geospatial query based at least in part on the one or more query parameters and a query weight; transmitting, from the dynamic query data caching system to a data access system, the geospatial query; receiving, at the dynamic query data caching system from the data access system, query results data associated with the geospatial query; storing, by the dynamic query data caching system, the query results data at a query results data store; storing, by the dynamic query data caching system, storage location data for the query results data stored a query results data store; generating, by the dynamic query data caching system, a temporary link to the storage location data for the query results data; and transmitting, from the dynamic query data caching system to the computing device, the temporary link.

B: The method of paragraph A further comprising detecting a query weight evaluation condition; in response to detecting the query weight evaluation condition, comparing the query weight to a query weight threshold value; and removing the query results data from the query results data store.

C: The method of paragraph A or B, further comprising detecting a subsequent query request associated with the geospatial query from a second computing device distinct from the computing device; generating a second temporary link to the storage location data for the query results data; and transmitting the second temporary link to the second computing device.

D: The method of any of paragraphs A-C, further comprising detecting a subsequent query request associated with the geospatial query from a second computing device distinct from the computing device; and in response to detecting the subsequent query request, modifying the query weight by performing one of reinitializing the query weight or incrementing the query weight.

E: The method of any of paragraphs A-D, further comprising detecting a subsequent query request associated with the geospatial query from a second computing device distinct from the computing device; and in response to detecting the subsequent query request: generating a second temporary link to the storage location data for the query results data; and modifying the query data structure to include a time of generation of the second temporary link.

F: The method of any of paragraphs A-E, further comprising detecting a query weight evaluation condition; in response to detecting the query weight evaluation condition, determining a query access time for the geospatial query; and reducing the query weight based at least in part on the query access time.

G: The method of paragraph F, wherein reducing the query weight is based at least in part on a logarithmic decay function.

H: A dynamic query data caching system, comprising one or more processors; and non-transitory computer-readable media storing computer-executable instructions that, when executed by the one or more processors, cause the one or more processors to perform operations comprising: receiving, from a requestor device, a query request comprising one or more query parameters, generating a query based at least in part on the one or more query parameters; determining, based at least in part on the query, a query data structure at a query data store; determining, based at least in part on the query data structure, a storage location at a query results data store for query results data associated with the query; generating a temporary link to the storage location; and transmitting the temporary link to the requestor device.

I: The dynamic query data caching system of paragraph H, wherein the operations further comprise, based at least in part on determining the query data structure, one of: incrementing a query weight in the query data structure; or initializing the query weight in the query data store.

J: The dynamic query data caching system of paragraph H or I, wherein the operations further comprise: detecting a query results update condition; in response to detecting the query results update condition, transmitting the query to a data access system; receiving updated query results data from the data access system; and updating the storage location at the query results data store with the updated query results data.

K: The dynamic query data caching system of paragraph J, wherein the query results update condition comprises one or more of a time period expiration, a detection of a high volume of query requests, an instruction, or a dataset update.

L: The dynamic query data caching system of any of paragraphs H-K, wherein the operations further comprise: detecting a query weight evaluation condition; in response to detecting the query weight evaluation condition, determining a last used time based at least in part on the query data structure; and reducing a query weight in the query data structure based at least in part on the last used time.

M: The dynamic query data caching system of paragraph L, wherein the query weight evaluation condition comprises one or more of a time period expiration, a detection of a high volume of query requests, an instruction, or a dataset update.

N: The dynamic query data caching system of any of paragraphs H-M, wherein determining the storage location comprises: determining a query identifier in the query data structure; and determine that the storage location at the query results data store is associated with the query identifier.

O: A non-transitory computer-readable media storing computer-executable instructions that, when executed by one or more processors, cause the one or more processors to perform operations comprising receiving, from a requestor device, a query request comprising one or more query parameters, generating a query based at least in part on the one or more query parameters; determining, based at least in part on the query, a query data structure at a query data store; determining, based at least in part on the query data structure, a storage location at a query results data store for query results data associated with the query; generating a temporary link to the storage location; and transmitting the temporary link to the requestor device.

P: The non-transitory computer-readable media of paragraph O, wherein determining the query data structure comprises determining that the query is not represented in the query data store; and in response to determining that the query is not represented in the query data store, generating the query data structure to include the query.

Q: The non-transitory computer-readable media of paragraph P, wherein determining the query data structure comprises including a last use time and a query weight in the query data structure.

R: The non-transitory computer-readable media of paragraph P, wherein determining the storage location comprises transmitting the query to a data access system; receiving the query results data from the data access system; and storing the query results data at the storage location at the query results data store.

S: The non-transitory computer-readable media of paragraph R, wherein the operations further comprise associating a query identifier represented in the query data structure with the storage location at the query results data store.

T: The non-transitory computer-readable media of paragraph S, wherein the query identifier is based at least in part on at least one of a hash of the query or geospatial data associated with the one or more query parameters.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A-T.

CONCLUSION

Although the descriptions provided herein may be in the context of certain radio access technologies, networks, and network topologies, such as 5G/NR mobile communications, the proposed concepts, schemes, and any variations thereof may be implemented in, for and by other types of radio access technologies, networks, and network topologies. Such radio access technologies, networks, and network topologies may include, for example and without limitation, Long-Term Evolution (LTE), 6G, Internet-of-Things (IoT), Narrow Band Internet of Things (NB-IoT), vehicle-to-everything (V2X), fixed wireless internet, and non-terrestrial network (NTN) communications. Thus, the scope of the disclosure is not limited to the examples described herein.

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes that come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:

receiving, at a dynamic query data caching system from a computing device, a query request comprising one or more query parameters, generating, at the dynamic query data caching system, a query data structure comprising a geospatial query based at least in part on the one or more query parameters and a query weight;

transmitting, from the dynamic query data caching system to a data access system, the geospatial query;

receiving, at the dynamic query data caching system from the data access system, query results data associated with the geospatial query;

storing, by the dynamic query data caching system, the query results data at a query results data store;

storing, by the dynamic query data caching system, storage location data for the query results data stored a query results data store;

generating, by the dynamic query data caching system, a temporary link to the storage location data for the query results data;

transmitting, from the dynamic query data caching system to the computing device, the temporary link;

detecting a query weight evaluation condition;

in response to detecting the query weight evaluation condition, determining a query access time for the geospatial query; and reducing the query weight based at least in part on the query access time.

2. The method of claim 1, further comprising:

detecting an additional query weight evaluation condition;

in response to detecting the additional query weight evaluation condition, comparing the query weight to a query weight threshold value; and removing the query results data from the query results data store when the comparing of the query weight to the query weight threshold value indicates the query has expired.

3. The method of claim 1, further comprising:

detecting a subsequent query request associated with the geospatial query from a second computing device distinct from the computing device;

generating a second temporary link to the storage location data for the query results data; and transmitting the second temporary link to the second computing device.

4. The method of claim 1, further comprising:

detecting a subsequent query request associated with the geospatial query from a second computing device distinct from the computing device; and in response to detecting the subsequent query request, modifying the query weight by performing one of reinitializing the query weight or incrementing the query weight.

5. The method of claim 1, further comprising:

detecting a subsequent query request associated with the geospatial query from a second computing device distinct from the computing device; and in response to detecting the subsequent query request:

generating a second temporary link to the storage location data for the query results data; and modifying the query data structure to include a time of generation of the second temporary link.

6. The method of claim 1, wherein reducing the query weight is based at least in part on a logarithmic decay function.

7. A dynamic query data caching system, comprising:

one or more processors; and non-transitory computer-readable media storing computer-executable instructions that, when executed by the one or more processors, cause the one or more processors to perform operations comprising:

receiving, from a requestor device, a query request comprising one or more query parameters, generating a query based at least in part on the one or more query parameters;

determining, based at least in part on the query, a query data structure at a query data store;

determining, based at least in part on the query data structure, a storage location at a query results data store for query results data associated with the query;

generating a temporary link to the storage location;

transmitting the temporary link to the requestor device;

detecting a query weight evaluation condition;

in response to detecting the query weight evaluation condition, determining a query access time for the query; and reducing a query weight for the query based at least in part on the query access time.

8. The dynamic query data caching system of claim 7, wherein the operations further comprise, based at least in part on determining the query data structure, one of:

incrementing a query weight in the query data structure; or initializing the query weight in the query data store.

9. The dynamic query data caching system of claim 7, wherein the operations further comprise:

detecting a query results update condition;

in response to detecting the query results update condition, transmitting the query to a data access system;

receiving updated query results data from the data access system; and updating the storage location at the query results data store with the updated query results data.

10. The dynamic query data caching system of claim 9, wherein the query results update condition comprises one or more of a time period expiration, a detection of a high volume of query requests, an instruction, or a dataset update.

11. The dynamic query data caching system of claim 7, wherein determining the query access time includes determining a last used time based at least in part on the query data structure, and wherein reducing the query weight includes reducing the query weight in the query data structure based at least in part on the last used time.

12. The dynamic query data caching system of claim 11, wherein the query weight evaluation condition comprises one or more of a time period expiration, a detection of a high volume of query requests, an instruction, or a dataset update.

13. The dynamic query data caching system of claim 7, wherein determining the storage location comprises:

determining a query identifier in the query data structure; and determine that the storage location at the query results data store is associated with the query identifier.

14. A non-transitory computer-readable media storing computer-executable instructions that, when executed by one or more processors, cause the one or more processors to perform operations comprising:

receiving, from a requestor device, a query request comprising one or more query parameters, generating a query based at least in part on the one or more query parameters;

determining, based at least in part on the query, a query data structure at a query data store;

determining, based at least in part on the query data structure, a storage location at a query results data store for query results data associated with the query;

generating a temporary link to the storage location; and transmitting the temporary link to the requestor device;

detecting a query weight evaluation condition;

in response to detecting the query weight evaluation condition, determining a query access time for the query; and reducing a query weight based at least in part on the query access time.

15. The non-transitory computer-readable media of claim 14, wherein determining the query data structure comprises:

determining that the query is not represented in the query data store; and in response to determining that the query is not represented in the query data store, generating the query data structure to include the query.

16. The non-transitory computer-readable media of claim 15, wherein determining the query data structure comprises including a last use time and a query weight in the query data structure.

17. The non-transitory computer-readable media of claim 15, wherein determining the storage location comprises:

transmitting the query to a data access system;

receiving the query results data from the data access system; and storing the query results data at the storage location at the query results data store.

18. The non-transitory computer-readable media of claim 17, wherein the operations further comprise associating a query identifier represented in the query data structure with the storage location at the query results data store.

19. The non-transitory computer-readable media of claim 18, wherein the query identifier is based at least in part on at least one of a hash of the query or geospatial data associated with the one or more query parameters.

* * * * *